(12) United States Patent
Smith, Jr.

(10) Patent No.: US 10,244,772 B2
(45) Date of Patent: Apr. 2, 2019

(54) METHOD FOR CREATING LAYERED CHOCOLATE BODY AND CHOCOLATE MOLD FOR CREATION THEREOF

(71) Applicant: Richard H Smith, Jr., Tacoma, WA (US)

(72) Inventor: Richard H Smith, Jr., Tacoma, WA (US)

(73) Assignee: SAGRA, INC., Silverdale, WA (US)

( * ) Notice: Subject to any disclaimer, the term of this patent is extended or adjusted under 35 U.S.C. 154(b) by 161 days.

(21) Appl. No.: 14/919,559

(22) Filed: Oct. 21, 2015

(65) Prior Publication Data
US 2016/0128349 A1 May 12, 2016

Related U.S. Application Data

(60) Provisional application No. 62/075,961, filed on Nov. 6, 2014.

(51) Int. Cl.
*A23G 1/00* (2006.01)

(52) U.S. Cl.
CPC ......... *A23G 1/0086* (2013.01); *A23G 1/0066* (2013.01); *A23G 1/0096* (2013.01)

(58) Field of Classification Search
CPC .. A23G 1/0066; A23G 1/0086; A23G 1/0096; B29C 39/32; B29C 39/26; F25C 1/04; F25C 1/10; B65D 5/643; A23P 10/10; A23P 30/10; B67B 7/14; B67B 7/18; A21B 3/132; A21B 3/134; A21B 3/137; A21B 3/138
See application file for complete search history.

(56) References Cited

U.S. PATENT DOCUMENTS

| | | | | |
|---|---|---|---|---|
| 557,685 A * | 4/1896 | Mains | .................... | A21B 3/137 220/529 |
| 559,788 A * | 5/1896 | Perrottet | ................. | A21B 3/137 100/910 |
| 572,509 A * | 12/1896 | Wilson | .................... | B28B 7/168 249/144 |
| 993,914 A * | 5/1911 | Truman | .................... | A21B 3/13 220/4.03 |
| 1,727,257 A * | 9/1929 | Stratton | ................. | A21B 3/137 220/625 |
| 1,836,026 A * | 12/1931 | Helle | ........................ | A23D 7/02 366/256 |

(Continued)

*Primary Examiner* — Joseph S Del Sole
*Assistant Examiner* — Emmanuel S Luk

(57) ABSTRACT

A chocolate mold is provided for the creation of a layered chocolate body. The chocolate mold has a tubular shell connected to a primary platform. A food-safe platform is formed within the tubular shell and atop the primary platform, serving as a base for the layered chocolate body. A shaft is connected to the food-safe platform, with the layered chocolate body being formed about the shaft. A lid and handle are attached to the shaft atop the tubular shell. An elongated slit allows the tubular shell to easily be peeled away from the layered chocolate body, while clamping mechanisms seal the tubular shell during molding of the layered chocolate body. A tilt mechanism is used to angle the primary platform and create angled chocolate layers which are visually appealing. The layered chocolate body is formed by sequentially pouring and solidifying layers of chocolate to the tubular shell.

14 Claims, 12 Drawing Sheets

(56) References Cited

U.S. PATENT DOCUMENTS

| | | | | |
|---|---|---|---|---|
| 2,030,344 A | * | 2/1936 | Young | A21B 3/137 220/4.03 |
| 2,039,374 A | * | 5/1936 | Young | B65D 81/343 206/216 |
| 2,325,841 A | * | 8/1943 | Faber | A47J 45/077 220/758 |
| 2,611,250 A | * | 9/1952 | Rodacker | A22C 7/0046 100/212 |
| 2,960,218 A | * | 11/1960 | Cheeley | A21B 3/13 126/390.1 |
| 3,043,424 A | * | 7/1962 | Howard | B05C 17/00553 206/219 |
| 3,144,966 A | * | 8/1964 | Cook | B01F 7/00208 156/500 |
| 3,196,777 A | * | 7/1965 | Luker | A21B 3/13 220/3.5 |
| 3,209,673 A | * | 10/1965 | Howard | A23L 3/10 126/349 |
| 3,252,683 A | * | 5/1966 | Uetzmann | A21B 3/13 249/160 |
| 3,262,668 A | * | 7/1966 | Luker | A21B 3/13 220/573.1 |
| 3,494,467 A | * | 2/1970 | Paisley | B01D 29/39 210/241 |
| 3,593,853 A | * | 7/1971 | Koethke | B01D 35/16 210/320 |
| 3,645,758 A | * | 2/1972 | MacManus | B65D 11/02 206/525 |
| 3,754,852 A | * | 8/1973 | Rempel | B29C 33/00 425/429 |
| 4,063,864 A | * | 12/1977 | Oberwelland | A23G 3/2023 425/120 |
| 4,272,199 A | * | 6/1981 | Hade | B01F 11/0054 206/222 |
| 4,395,015 A | * | 7/1983 | Reardon | A21B 3/13 220/506 |
| 4,416,907 A | * | 11/1983 | Watkins | B65D 81/3453 219/734 |
| 4,436,500 A | * | 3/1984 | Allen | A23G 1/21 141/137 |
| 4,644,858 A | * | 2/1987 | Liotto | A21B 3/137 219/725 |
| 4,839,048 A | * | 6/1989 | Reed | B01D 35/30 210/450 |
| 4,865,014 A | * | 9/1989 | Nelson | F24H 1/18 122/19.2 |
| 5,102,005 A | * | 4/1992 | Trussler | B29D 22/003 220/4.12 |
| 5,533,801 A | * | 7/1996 | Safont | A47J 43/085 241/199.12 |
| 5,538,217 A | * | 7/1996 | Chauhan | A21B 3/18 249/134 |
| 5,605,646 A | * | 2/1997 | Colombo | A47J 36/022 249/134 |
| 5,653,359 A | * | 8/1997 | Sondermann | A21B 3/137 220/323 |
| 5,676,050 A | * | 10/1997 | Beck | A21B 3/137 249/DIG. 1 |
| 5,678,475 A | * | 10/1997 | Villar Otero | A21B 3/137 249/DIG. 1 |
| 5,934,800 A | * | 8/1999 | Bonacci | B01F 15/0074 366/213 |
| 5,954,236 A | * | 9/1999 | Virnelson | B05C 17/00553 206/219 |
| 6,115,935 A | * | 9/2000 | Collins | B44D 3/006 15/65 |
| 7,731,414 B2 | * | 6/2010 | Vincent | B01F 11/0002 210/222 |
| 7,866,465 B2 | * | 1/2011 | Dverin | B01F 15/0087 206/219 |
| 7,913,970 B2 | * | 3/2011 | Bennet | A21B 3/137 229/123.2 |
| 8,753,005 B2 | * | 6/2014 | Singh | B01F 3/04539 366/205 |
| 9,107,421 B2 | * | 8/2015 | Campbell | A21B 3/135 |
| 9,220,277 B1 | * | 12/2015 | Allen | A47J 36/04 |
| 9,532,676 B1 | * | 1/2017 | Winfield | A47J 27/04 |
| 2004/0069881 A1 | * | 4/2004 | Arduini | A47J 42/04 241/169.1 |
| 2005/0193899 A1 | * | 9/2005 | DeBlassie | A21B 3/136 99/426 |
| 2008/0111050 A1 | * | 5/2008 | Hamblin | A21B 3/137 249/61 |
| 2008/0259723 A1 | * | 10/2008 | Rhodes | A47J 43/1018 366/247 |
| 2008/0285378 A1 | * | 11/2008 | Roggero | G01N 1/286 366/140 |
| 2012/0024865 A1 | * | 2/2012 | Riedl | A21B 3/137 220/573.1 |
| 2014/0178550 A1 | * | 6/2014 | Slutsky | A47J 43/20 426/512 |
| 2014/0269152 A1 | * | 9/2014 | Venot | B01F 7/0055 366/129 |
| 2016/0030900 A1 | * | 2/2016 | Jin | A47J 43/0465 261/141 |

\* cited by examiner

US 10,244,772 B2

METHOD FOR CREATING LAYERED CHOCOLATE BODY AND CHOCOLATE MOLD FOR CREATION THEREOF

The current application claims a priority to the U.S. Provisional Patent application Ser. No. 62/075,961 filed on Nov. 6, 2014.

FIELD OF THE INVENTION

The present invention relates generally to a method for creating an angled layered chocolate body through the use of a chocolate mold.

BACKGROUND OF THE INVENTION

Chocolate is a favorite desert ingredient of people in cultures all across the globe. Cocoa was cultivated and consumed by indigenous populations in Mexico and South America as far back as 1900. Columbus and other conquistadors brought chocolate back to Europe in the 16$^{th}$ century, where it was sweetened with honey and sugar. Due to the difficulty of processing cocoa, chocolate remained a delicacy reserved for the upper classes until the industrial revolution. Throughout the 19$^{th}$ century, methods and processes for making and molding chocolate were expanded and refined. There exist many kinds of chocolate including pure unsweetened chocolate, sweet chocolate, milk chocolate, and white chocolate. Chocolate comes in many forms and may be consumed as a liquid, a solid, a coating, or a topping. The chocolate industry does an estimated $50 billion per year of business. Unique and novel ways of making and processing chocolate are important industrial processes and the inventors must be protected. One of the more difficult techniques involves crafting chocolate solids which are made up of layers of chocolate which are oriented at an angle with respect to a flat surface. It is the objective of the present invention to introduce a chocolate cylinder which is made up of angled layers of chocolate and has a hole in the middle so that it may create an impressive visual effect when rotated, and a method and apparatus for creating the chocolate cylinder.

DETAIL DESCRIPTIONS OF THE INVENTION

Figure 1:
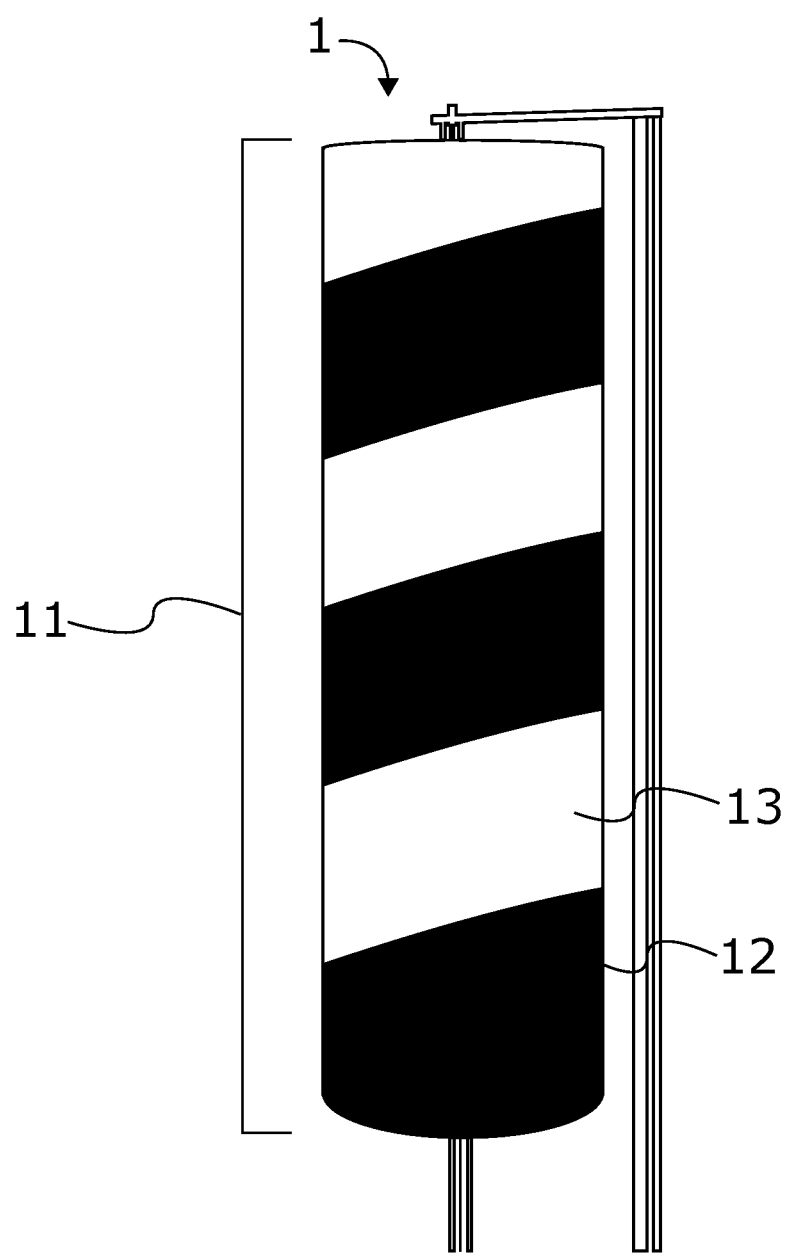
FIG. 1 is a depiction of a layered chocolate body with rotating mechanism, formed through utilization of the present invention.
Figure 2:
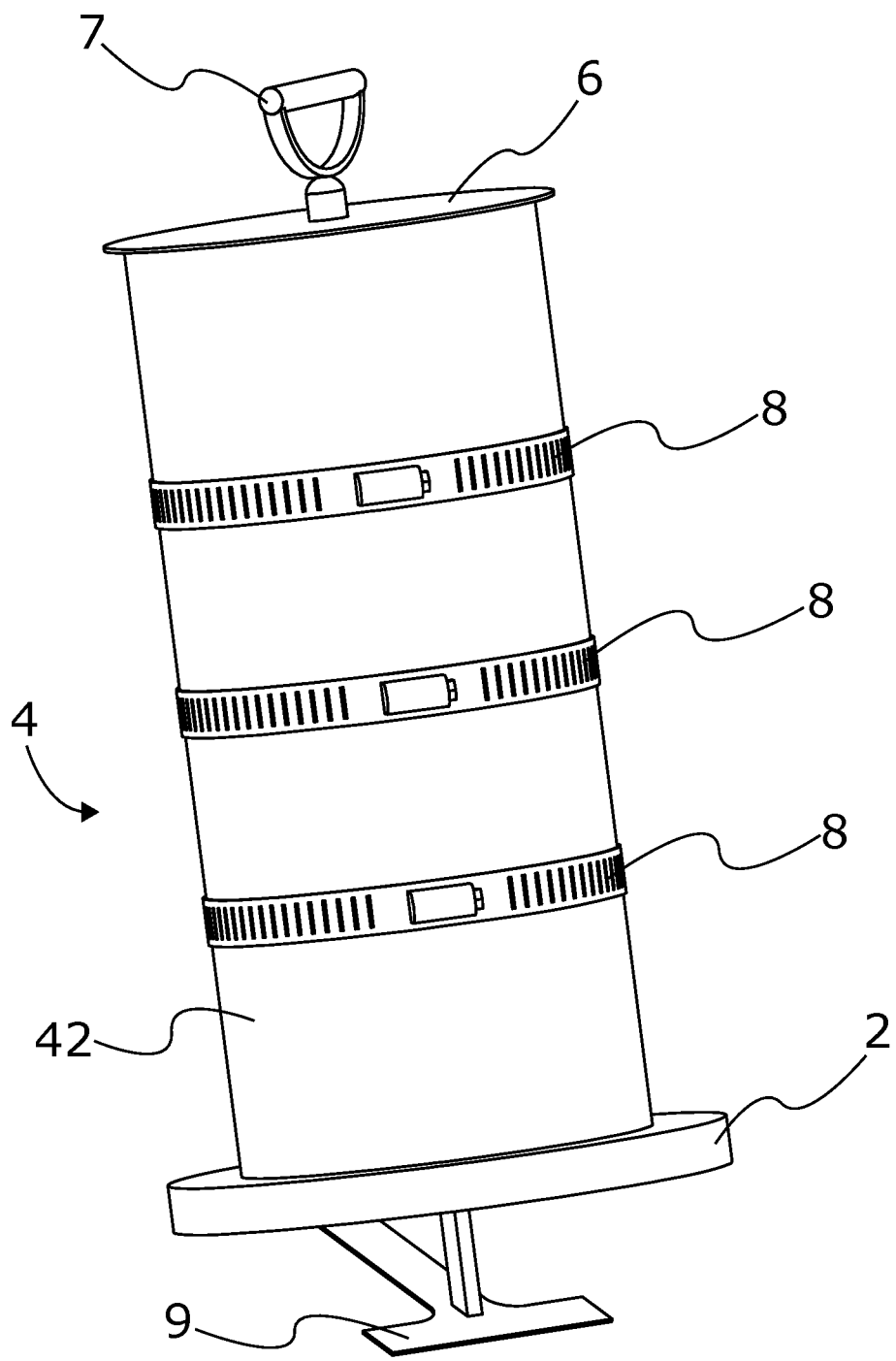
FIG. 2 is a perspective view showing a chocolate mold of the present invention at an angle.
Figure 3:
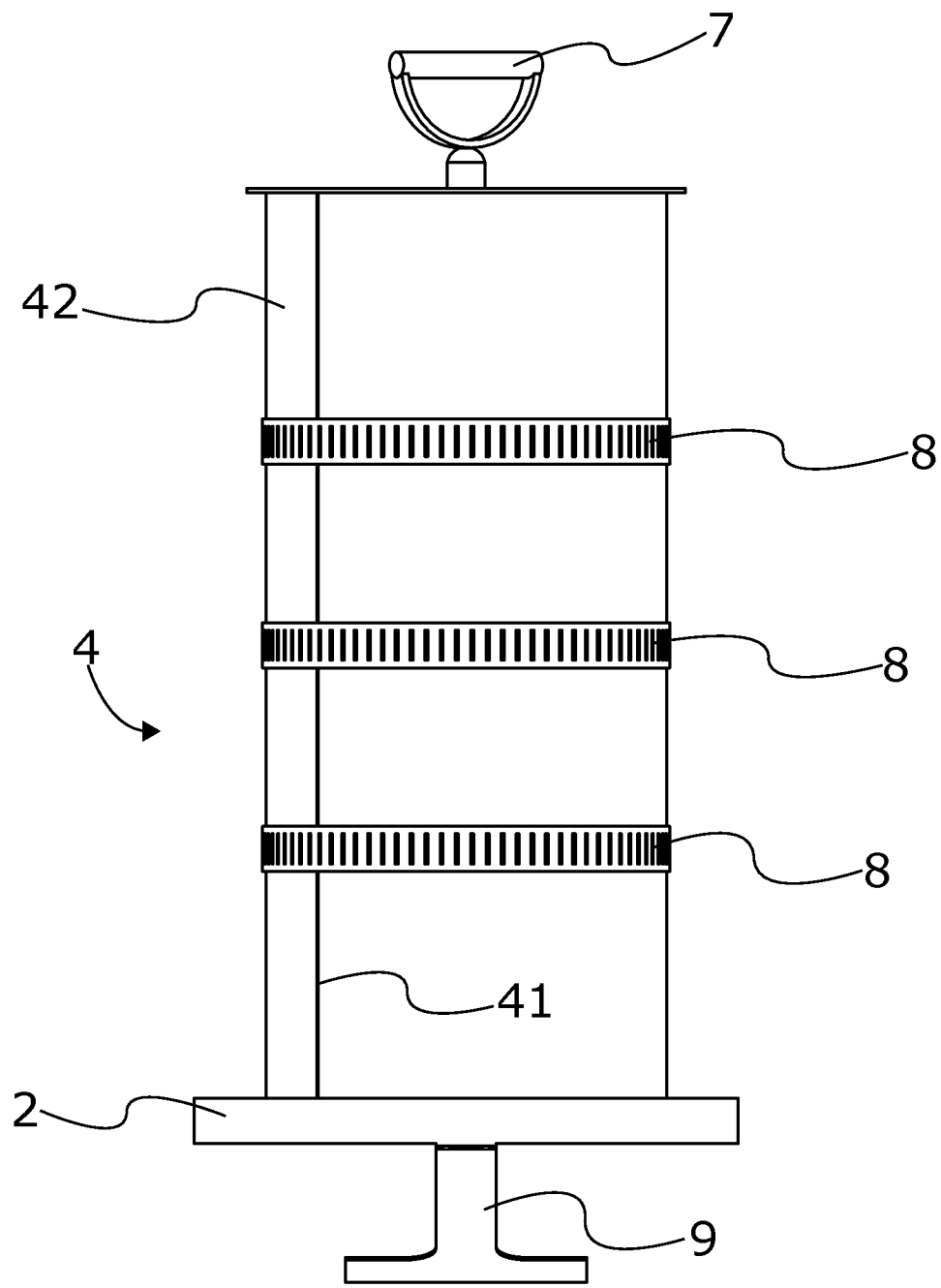
FIG. 3 is a front view of the chocolate mold at an angle, showing an elongated slit of a tubular shell of the present invention.
Figure 4:
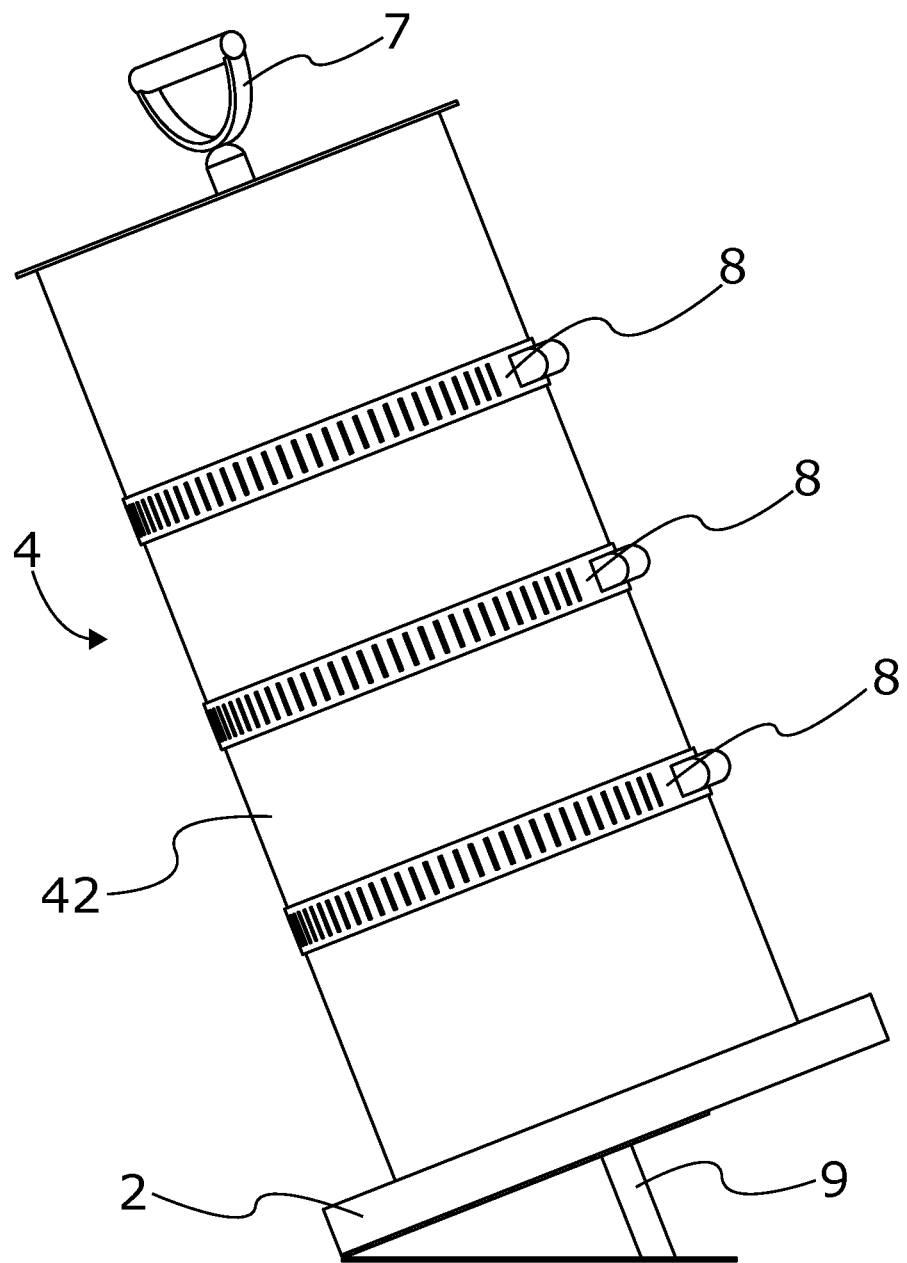
FIG. 4 is a left side view of the chocolate mold at an angle.
Figure 5:
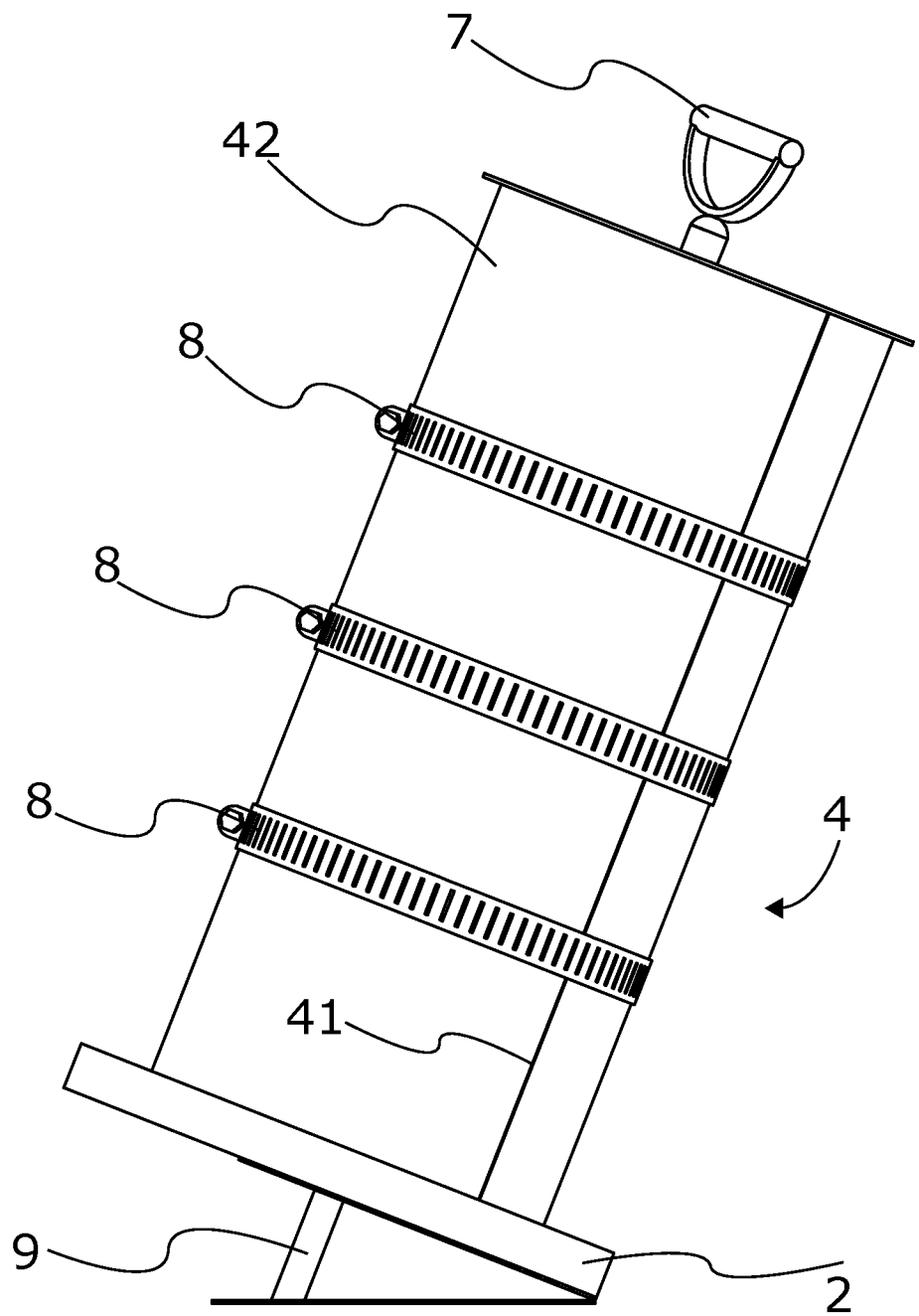
FIG. 5 is a right side view of the chocolate mold at an angle, showing the elongated slit.
Figure 6:
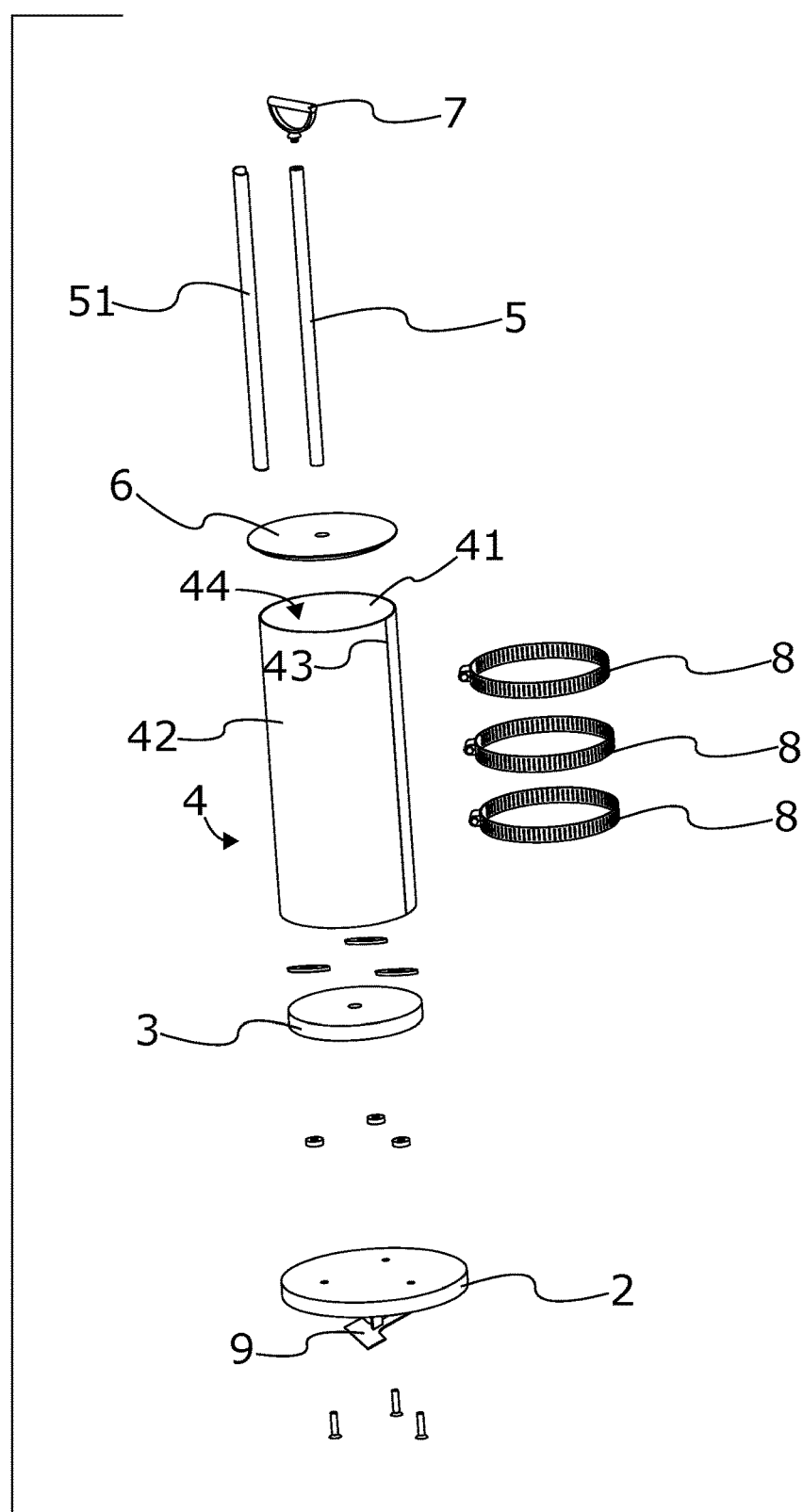
FIG. 6 is an exploded perspective view of the present invention, showing fasteners, washers, food-safe platform, shaft, and food-safe covering of the present invention.
Figure 7:
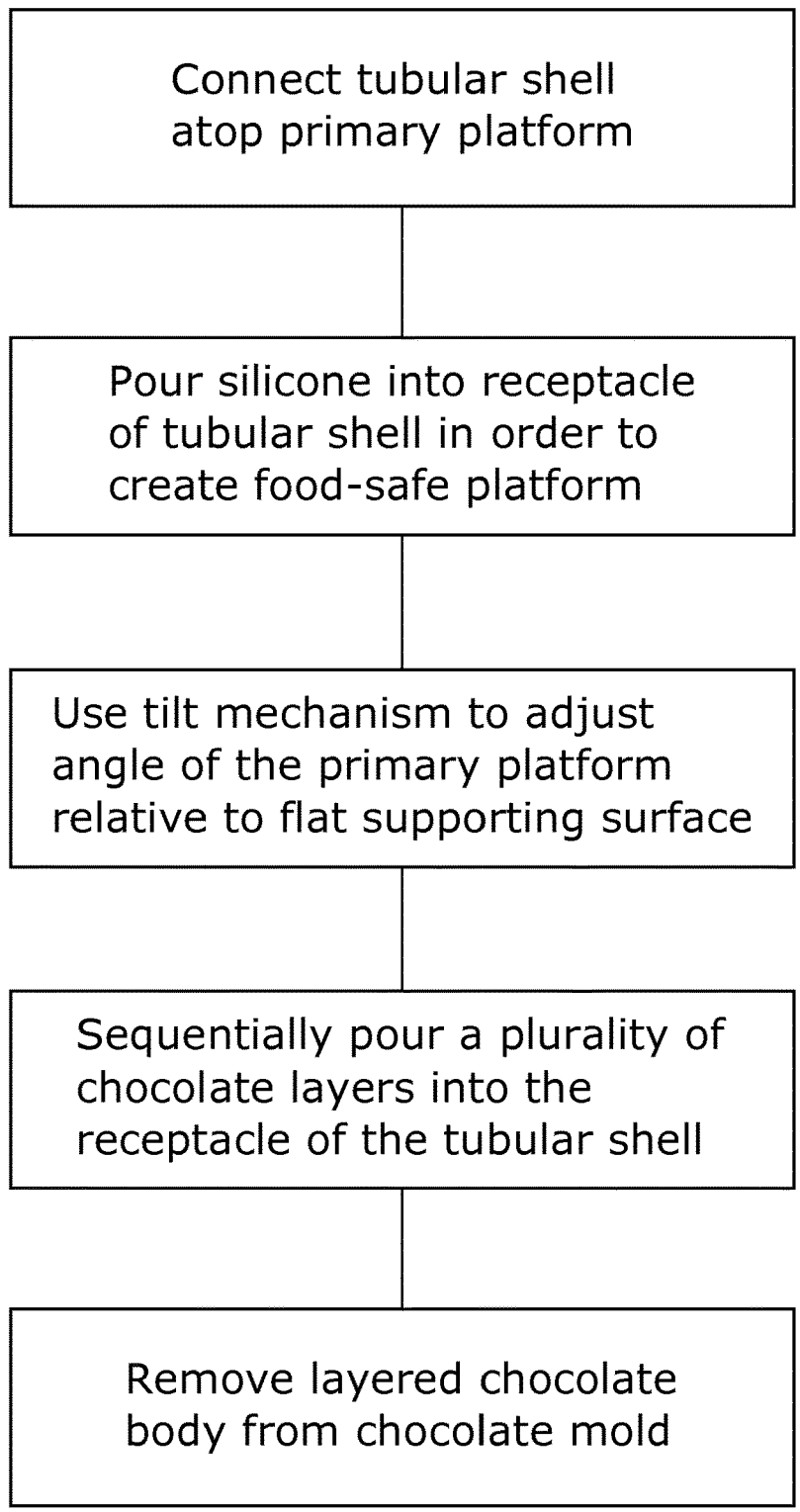
FIG. 7 is an outline of the general steps of the method of the present invention.
Figure 8:
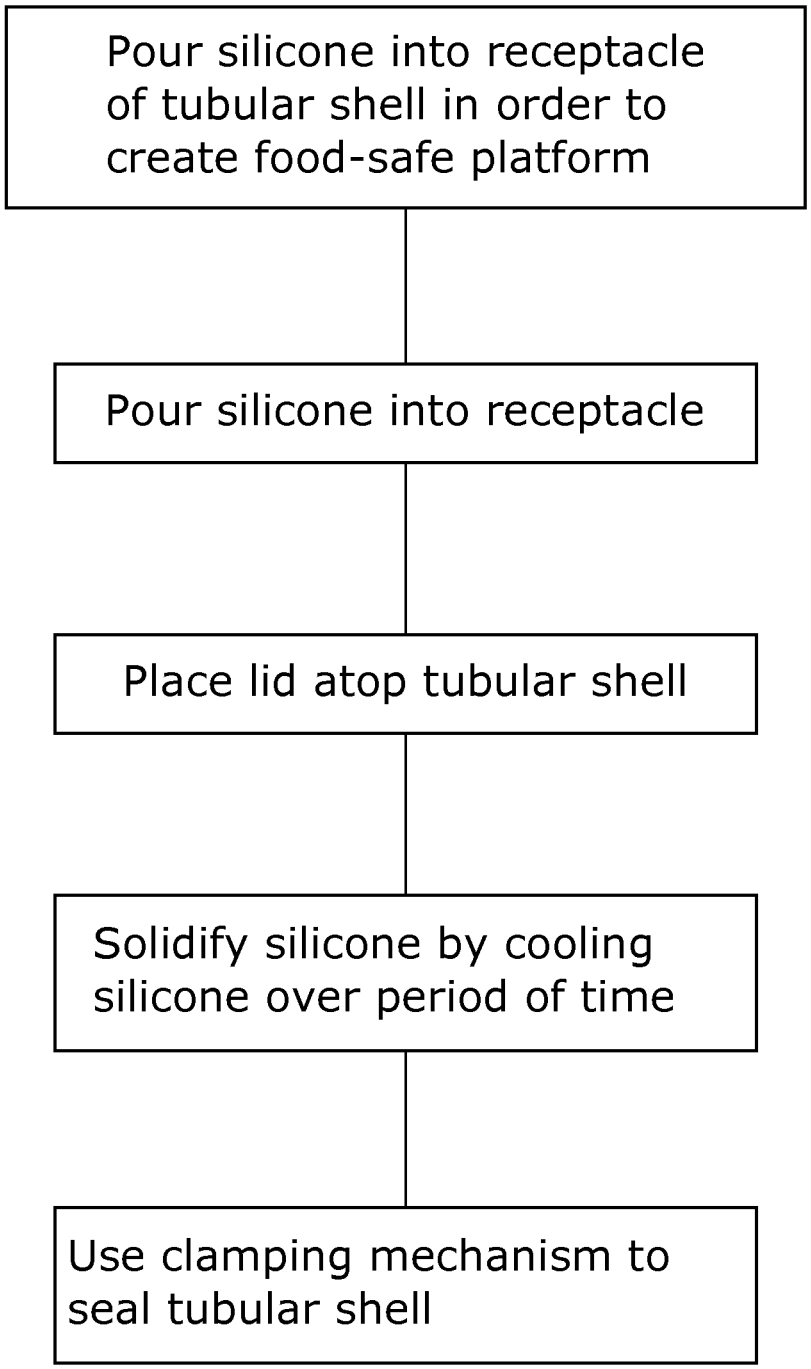
FIG. 8 is a flowchart describing formation of the food-safe platform of the present invention.
Figure 9:
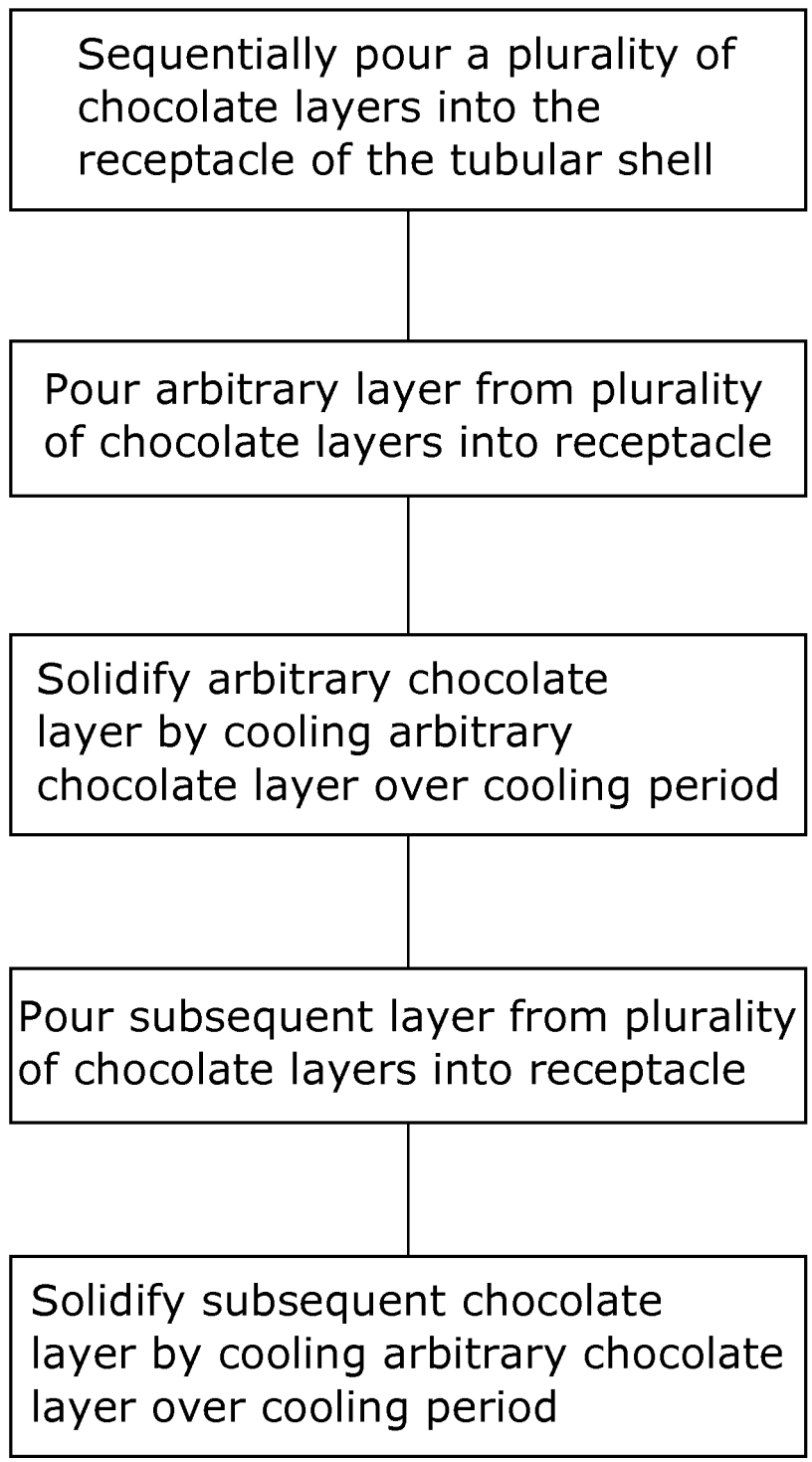
FIG. 9 is a flowchart defining formation of a plurality of chocolate layers of the present invention.
Figure 10:
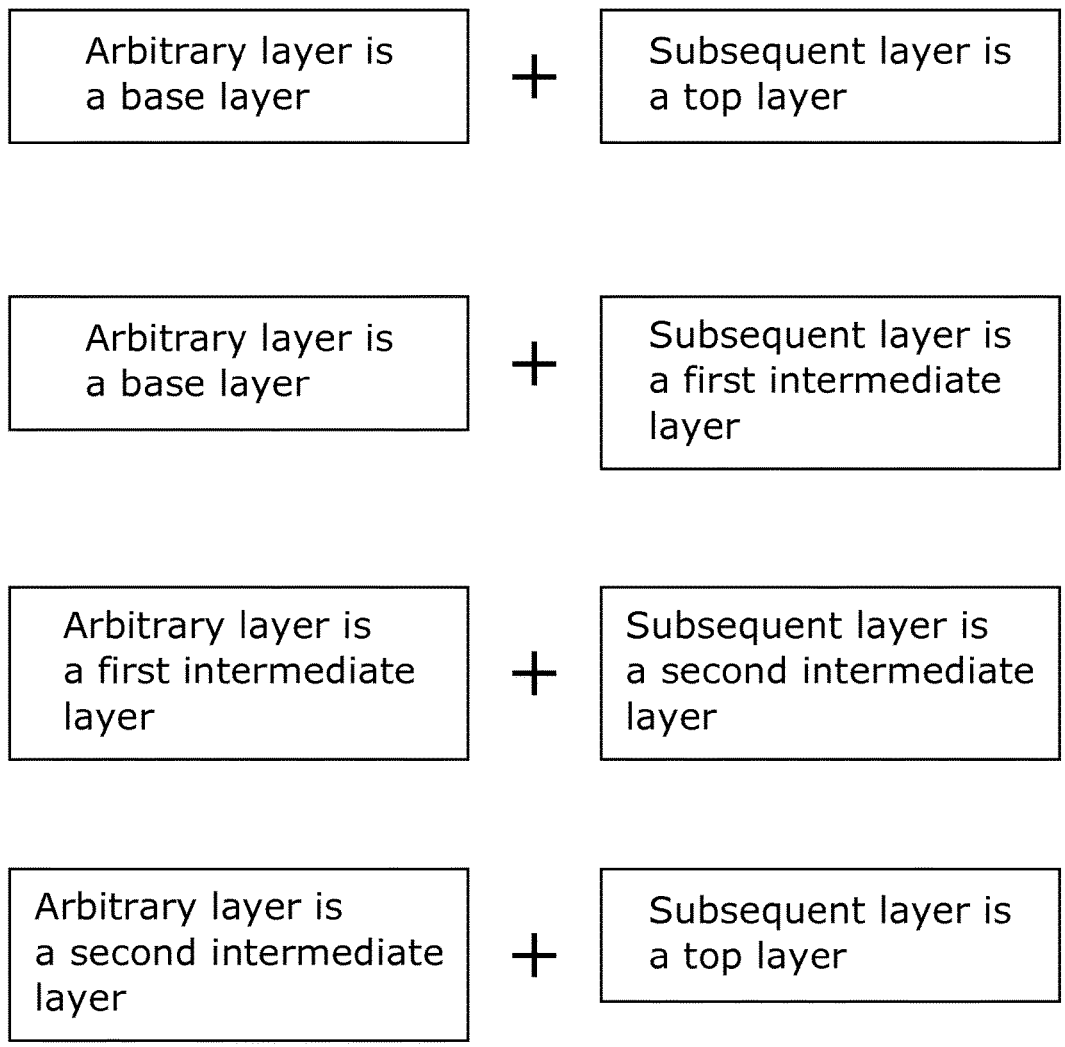
FIG. 10 is an illustration showing specific examples of an arbitrary chocolate layer and a subsequent chocolate layer from the plurality of chocolate layers.

All illustrations of the drawings are for the purpose of describing selected versions of the present invention and are not intended to limit the scope of the present invention.

The present invention is a chocolate mold that is capable of creating a layered chocolate body 1, including one with the layers offset at an angle. The apparatus of the present invention comprises a primary platform 2, a food-safe platform 3, a tubular shell 4, a shaft 5, and a lid 6. These components are configured to form an enclosure into which liquid chocolate can be poured and solidified in order to create the layered chocolate body 1. The present invention is depicted via FIG. 1-FIG. 12.

The food-safe platform 3 is connected onto the primary platform 2, such that the food-safe platform 3 is supported by the primary platform 2. The tubular shell 4 is perimetrically connected adjacent to the food-safe platform 3. The tubular shell 4 thus forms a wall that enclosed an interior volume, into which the aforementioned liquid chocolate can be poured. The shaft 5, about which the layered chocolate body 1 is formed, is connected adjacent to the food-safe platform 3. The shaft 5 is positioned interior to the tubular shell 4, with the former being encircled by the latter. The lid 6 is attached adjacent to the tubular shell 4, opposite the food-safe platform 3. The lid 6 serves to cover the layered chocolate body 1, helping to maintain a food-safe environment within the tubular shell 4.

To help secure the primary platform 2 and food-safe platform 3, a plurality of fasteners are traversed through the primary platform 2. Each of the plurality of fasteners has an exposed end on a top surface of the primary platform 2; a flange washer is engaged with the free end. The fastener and flange washer serve as an anchor for the food-safe platform 3, which is a silicone material poured within the tubular shell 4 and allowed to solidify. The silicone material adheres to the washers during formation of the food-safe platform 3. The primary platform 2 itself can be made from a number of different materials, one example including polyvinyl chloride. The flange washers also can serve as attachment points for joining the tubular shell 4 to the primary platform 2. To help receive the fasteners, a plurality of countersunk bolt holes can be integrated into the primary platform 2. The fasteners are inserted through these countersunk bolt holes, allowing for a flush fit between the fasteners and primary platform 2.

To provide an improved grip for a user, the present invention further comprises a handle 7. The handle 7 is joined with the shaft 5, on an exposed face of the lid 6. The shaft 5, which receives the handle 7, traverses through the lid 6 at a right angle. This configuration allows the handle 7 to be attached adjacent to the shaft 5. Preferably, this attachment is through a threaded engagement, such that the handle 7 can be screwed onto the shaft 5 or unscrewed from the shaft 5.

As the chocolate mold is designed to form an edible chocolate structure for various uses, it is desirable to keep prevent the chocolate structure from becoming stuck to the chocolate mold. In support of this, a food-safe covering 51 is provided for the present invention. The food-safe covering 51 is superimposed onto the shaft 5, helping to separate the shaft 5 from a formed chocolate body.

The food-safe covering 51, in the preferred embodiment, is made of a polyurethane material. For example, the polyurethane material can be a thin polyurethane bag that is wrapped about the shaft 5. Other implantations of the food-safe covering 51 are possible. For example, in an alternative embodiment the food-safe covering 51 is a food grade grease which is applied to the shaft 5.

Elaborating upon the tubular shell 4, the tubular shell 4 comprises an inner lateral surface 41, an outer lateral surface 42, and an elongated slit 43. The elongated slit 43 allows for the tubular shell 4 to more easily be peeled away from a formed chocolate body. The elongated slit 43 creates a cut in the tubular shell 4, traversing along the tubular shell 4 from the food-safe platform 3 to the lid 6. The elongated slit 43 also traverses through the thickness of the tubular shell 4, from the inner lateral surface 41 to the outer lateral surface 42. In more basic terms, the tubular shell 4 is a rectangular membrane that is connected around the food-safe platform 3. The rectangular membrane is easily peeled away from a formed chocolate body by pulling at one of its corners. The ability to peel the tubular shell 4 away from a formed chocolate body helps to prevent breakage of the chocolate body.

The tubular shell 4 itself is preferably made of a transparent material, such as a clear acrylic. Transparency is a desirable property for the tubular shell 4 as it allows a person to see within the tubular shell 4, i.e. where chocolate is poured to form a chocolate body. This transparency allows a user see how much chocolate has been poured into the tubular shell 4, helping to ensure that the layers of chocolate are evenly formed. Preferably, the tubular shell 4 is also made of a food-safe material (e.g. the aforementioned acrylic), as it comes into direct contact with a formed chocolate body. Other materials can be used in place of acrylic, as long as these substituted materials are transparent and food-safe.

To help seal the tubular shell 4 about the formed chocolate body, an at least one clamping mechanism 8 is provided. The at least one clamping mechanism 8 is positioned around the outer lateral surface 42 of the tubular shell 4, acting as an annular restraint. When engaged, the clamping mechanism 8 is thus able to help keep the tubular shell 4 in place while a chocolate body is being formed. This is especially desirable as the tubular shell 4 could potentially come undone along the elongated slit 43, if the clamping mechanism 8 were to be omitted. The exact number of clamping mechanisms 8 utilized is variable; at the minimum there should be one clamping mechanism 8 engaged around the tubular shell 4. Three clamping mechanisms 8 are shown in the illustrated embodiment, but ultimately any number of clamping mechanisms 8 can be utilized without departing from the scope of the present invention.

In the preferred embodiment, the clamping mechanism 8 is a hose clamp, which allows a user to easily position and operate said clamping mechanism 8. In other embodiments different tools can be used to seal the tubular shell 4. For example, appropriately sized rubber bands or zip ties could be wrapped about the tubular shell 4 in order to help seal it. These are just a few examples of potential alternative options; hose clamps remain the preferred option as they are easily engaged and disengaged.

Figure 11:
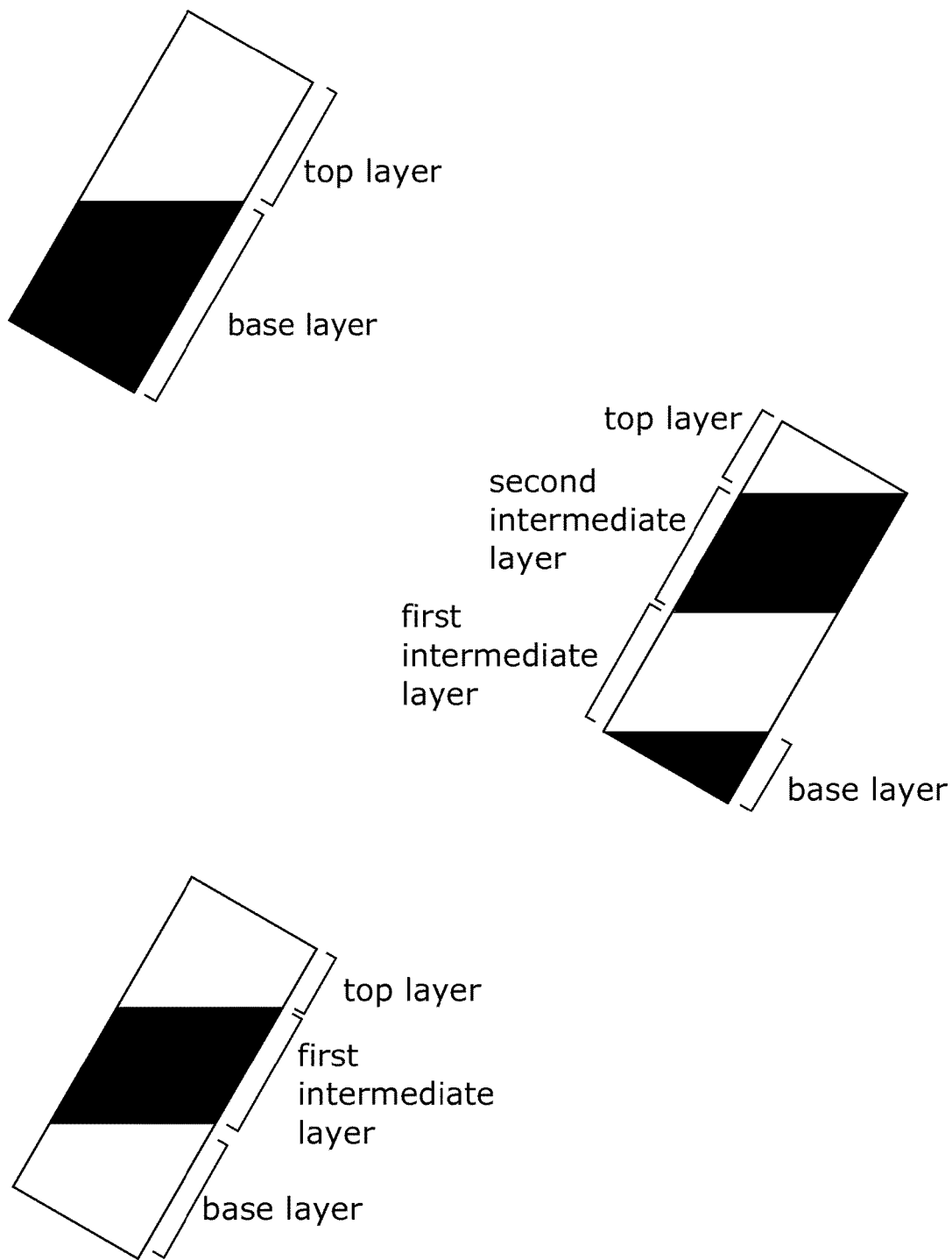
FIG. 11 is an illustration showing different numbers of layers as the plurality of chocolate layers.
Figure 12:
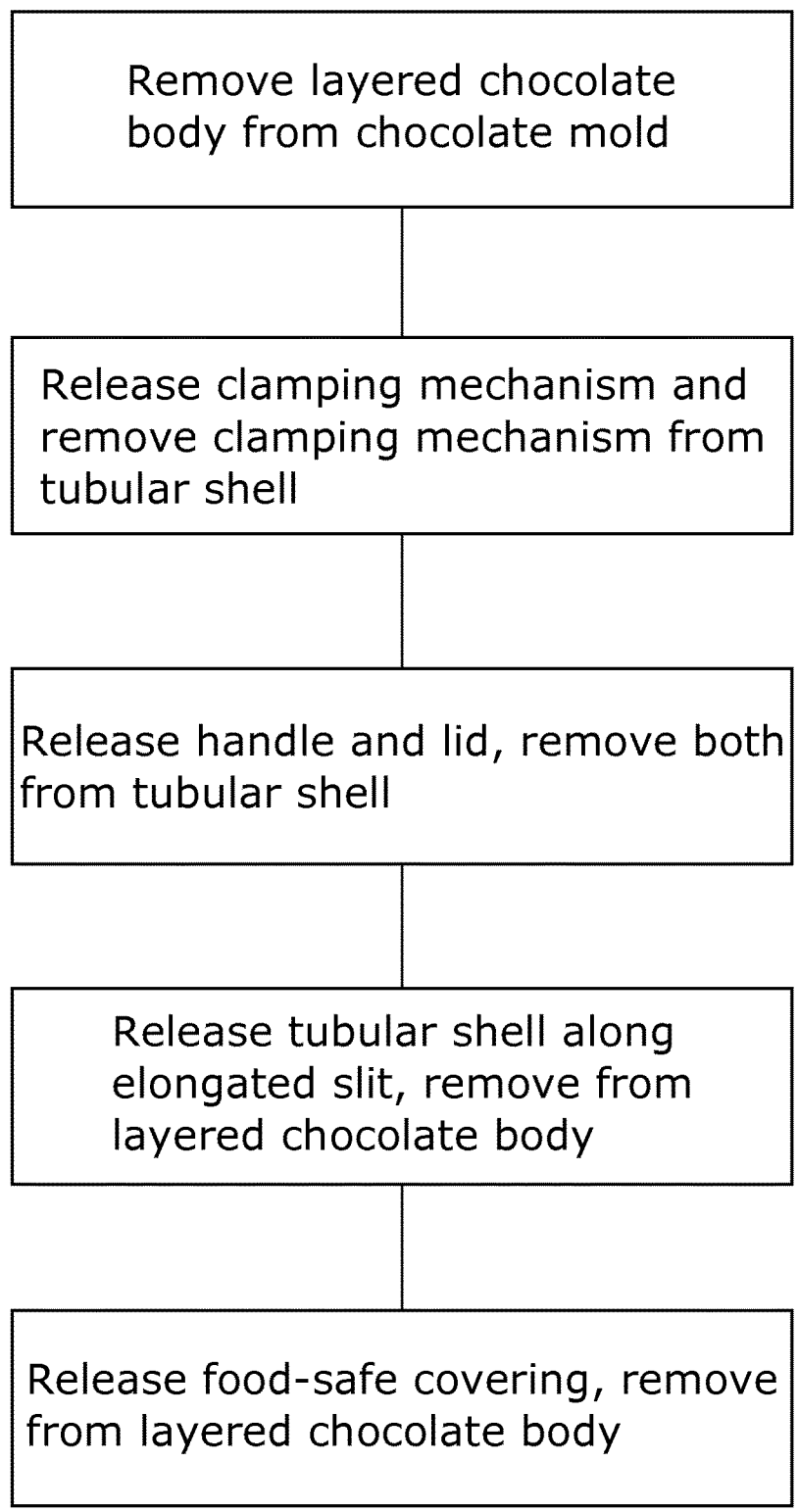
FIG. 12 is a flowchart defining removal of the layered chocolate body from the chocolate mold.

To allow a user to create chocolate bodies with angled layers, a tilt mechanism 9 is preferably provided. Visible in FIG. 2-FIG. 6, the tilt mechanism 9 is adjacently connected to the perimeter of the primary platform 2. The tilt mechanism 9 is connected to a bottom of the primary platform 2, opposite the food-safe platform 3. The tilt mechanism 9 allows for the primary platform 2 to be angled relative to a flat surface, e.g. a table. This enables the creation of angled layers of chocolate, as seen in FIG. 1 and FIG. 11.

The specific form of the tilt mechanism 9 is variable; for example, the tilt mechanism 9 can be a simple flap that is rotated in order to angle the primary platform 2. In a simpler embodiment, the tilt mechanism 9 is a block that is placed under an edge of the primary platform 2 in order to angle the primary platform 2. Other variations for the tilt mechanism 9 remain possible within the scope of the present invention.

The apparatus as thus far described allows a layered chocolate body 1 to be formed, as illustrated in FIG. 1. The method of forming a layered chocolate body 1 through use of the chocolate mold is subsequently expanded upon and illustrated in FIG. 7-FIG. 12.

First, in preparation for the pouring of the chocolate mold, the tubular shell 4 is adjacently connected atop the food-safe platform 3. The food-safe platform 3 can then be molded with the tubular shell 4 atop the primary platform 2; this is accomplished by pouring a silicone material into the tubular shell 4 and allowing it to solidify. The tubular shell 4 and food-safe platform 3 are thus joined with the primary platform 2, creating a receptacle 44 into which a plurality of chocolate layers 11 may be poured. The tilt mechanism 9 can then be engaged, angling the primarily platform in relation to a flat surface such as a table. The plurality of chocolate layers 11 can then be sequentially poured into the created receptacle 44. Once pouring of the chocolate layers 11 is completed, the formed layered chocolate body 1 is removed from the chocolate mold and is ready for use.

Once the tubular shell 4 has been joined with the food-safe platform 3, the at least one clamping mechanism 8 is secured around the tubular shell 4. Using a hose clamp as an example of the clamping mechanism 8, the hose clamp is first positioned around the tubular shell 4. A user then tightens the hose clamp about the tubular shell 4, helping to seal the tubular shell 4. The hose clamp is then locked, ensuring that it remains secured about the tubular shell 4.

As the layered chocolate body 1 is often used with rotating machines (from which chocolate can be scraped or shaved), the formation of a cavity within the layered chocolate body 1 is desirable. The cavity allows the layered chocolate body 1 to be coupled with a rotating machine, such as shown in part in FIG. 1. The shaft 5, which results in the formation of said cavity, is drilled into the food-safe platform 3 in order to create a threaded engagement between the shaft 5 and the food-safe platform 3. To provide a solid body to receive the shaft 5, the food-safe platform 3 is first allowed to solidify by allowing a period of time to elapse.

After the tubular shell 4, food-safe platform 3, and shaft 5 have been properly positioned, the tilt mechanism 9 is used to angle the primary platform 2. The tilt mechanism 9 can orient the primary platform 2 at any angle, though in the preferred embodiment and angle of 22.5 degrees is used to obtain a desired appearance for the layers of the layered chocolate body 1. Ultimately, any angle (realistically limited between 0 degrees and 90 degrees) can be set as desired by a user.

In order to create the layered chocolate body 1, each desired layer of chocolate must be separately poured into the receptacle 44 (bounded by the tubular shell 4 and the food-safe platform 3). This process begins by pouring an arbitrary chocolate layer 12 from the plurality of chocolate layers 11 into the receptacle 44. The arbitrary chocolate layer 12 is then allowed to solidify over a cooling period, during which the poured chocolate undergoes a phase transition from liquid to solid. Once the arbitrary chocolate layer 12 has solidified, a subsequent chocolate layer 13 can then be poured into the receptacle 44 onto the arbitrary chocolate layer 12. This subsequent chocolate layer 13 is then allowed to solidify over the cooling period. The result is two layers of solid chocolate, one atop the other. Depending on the desires of a user of the present invention, additional chocolate layers 11 can be added to create any number of chocolate layers 11 for the layered chocolate body 1.

For example, in one embodiment, where the layered chocolate body 1 is limited to two layers, the arbitrary chocolate layer 12 is a base chocolate layer 11 while the subsequent chocolate layer 13 is a top chocolate layer 11.

In another embodiment, where the layered chocolate body 1 has three chocolate layers 11, the arbitrary chocolate layer 12 can define a base layer while the subsequent chocolate layer 13 can define an intermediate layer. The arbitrary chocolate layer 12 can also define an intermediate chocolate layer 11, while the subsequent chocolate layer 13 defines a top chocolate layer 11.

Expanding upon this, for embodiments with four or more chocolate layers 11, the arbitrary chocolate layer 12 can also be a first intermediate chocolate layer 11 while the subsequent chocolate layer 13 can be a second intermediate chocolate layer 11.

The layered chocolate body 1 can thus be defined as a collection of arbitrary chocolate layers 12 and subsequent chocolate layers 13, as described above and shown in FIG. 10 and FIG. 11. Certain properties of the present invention, such as the transparency of the tubular shell 4, enhance this process. For example, a user can observe the height of the chocolate layer 11 being poured, as well as observe the consistency to help determine if the chocolate layer 11 has solidified. Once the final chocolate layer 11 has been poured and solidified, the formation of the layered chocolate body 1 is considered completed. The layered chocolate body 1 can then be removed from the chocolate mold.

To help keep the chocolate layers 11 clean and otherwise untarnished, the tubular shell 4 is covered by the lid 6 while allowing the arbitrary chocolate layer 12 and the subsequent chocolate layer 13 to cool. In order to allow the subsequent chocolate layer 13 to be poured into the receptacle 44 of the tubular shell 4, the lid 6 is removed after the arbitrary chocolate layer 12 has solidified. The subsequent chocolate layer 13 can then be poured into the receptacle 44 without issue; after pouring of the subsequent chocolate layer 13 the lid 6 is reattached to the tubular shell 4 while the subsequent chocolate layer 13 solidifies.

Removal of the layered chocolate body 1 from the chocolate mold begins with releasing the at least one clamping mechanism 8, allowing the at least one clamping mechanism 8 to be disengaged from the layered chocolate body 1. The clamping mechanism 8 is unlocked and taken off the layered chocolate body 1. This provides unfettered access to the tubular shell 4 and lid 6.

The lid 6, which covers the layered chocolate body 1 during the formation process, is released from the layered chocolate body 1 in order to continue disengaging the chocolate mold and the layered chocolate body 1. In embodiments where the lid 6 is secured between the shaft 5 and the handle 7, it is necessary to unscrew the handle 7 to enable removal of the lid 6.

After the clamping mechanism 8 and the lid 6 have been removed, the tubular shell 4 can then be released from the layered chocolate body 1. Thanks to the elongated slit 43, the tubular shell 4 easily peels away from the layered chocolate body 1 without causing any breaks or other damage to the layered chocolate body 1.

Finally, the shaft 5 is removed from the layered chocolate body 1, completing disengagement of the chocolate mold and the layered chocolate body 1. Removal of the shaft 5 from the layered chocolate body 1 is facilitated by the food-safe covering 51; the food-safe covering 51 reduces friction and prevents damage to the layered chocolate body 1 while the shaft 5 is being removed. In embodiments where the food-safe covering 51 is a wrap, such as a polyurethane bag or similar layer, it is removed from the cavity of the layered chocolate body 1. In embodiments where a food-safe grease or similar application is used, the removal of the food-safe covering 51 is not needed. The completed layered chocolate body 1 can then be used for a variety of purposes. In one example, the layered chocolate body 1 is mounted to a rotating machine by means of the cavity created by the shaft 5. For applications such as this, the layered chocolate body 1 preferably has a cylindrical shape, though different shapes can be used for the layered chocolate body 1.

The types of chocolate used for the layered chocolate body 1, as well as their pattern, is another variable aspect of the present invention. For example, the layered chocolate body 1 can be formed from alternating layers of white chocolate, milk chocolate, and dark chocolate. Resultantly, the layered chocolate body 1 can be specifically formed according to the desires of a user.

Although the invention has been explained in relation to its preferred embodiment, it is to be understood that many other possible modifications and variations can be made without departing from the spirit and scope of the invention as hereinafter claimed.

What is claimed is:

1. A mold for forming a chocolate body comprising:
a primary platform;
a secondary platform;
a tubular shell;
a shaft;
a lid;
a shaft covering;
a clamping mechanism;
a tilt mechanism;
the secondary platform being connected with the primary platform;
the tubular shell being perimetrically connected with the secondary platform;
the secondary platform being located in between the primary platform and the tubular shell;
the shaft being connected with the secondary platform;
the shaft being encircled by the tubular shell;
the lid being attached to the tubular shell;
the tubular shell being located in between the secondary platform and the lid;
the shaft covering being superimposed onto the shaft;
the tubular shell comprising an inner lateral surface, an outer lateral surface and an elongated slit;
the elongated slit radially traversing through the tubular shell from the inner lateral surface to the outer lateral surface;
the elongated slit longitudinally traversing through the tubular shell from the secondary platform to the lid;
the clamping mechanism perimetrically surrounding the outer lateral surface;
the tilt mechanism being connected with a bottom of the primary platform without being connected with the tubular shell and the clamping mechanism;

the primary platform being located in between the tilt mechanism and the secondary platform; and the tilt mechanism being perimetrically coincident with the primary platform.

2. The mold as claimed in claim 1 comprising:

a handle;

the shaft perpendicularly traversing through the lid;

the handle being attached to the shaft; and the lid being located in between the tubular shell and the handle.

3. The mold as claimed in claim 2 comprising:

the handle being threadibly engaged with the shaft.

4. The mold as claimed in claim 1 comprising:

the shaft covering being made of a polyurethane material.

5. The mold as claimed in claim 1 comprising:

the tubular shell being made of a transparent material.

6. A method of forming a layered chocolate body by using the mold as claimed in claim 1, the method comprising the steps of:

connecting the tubular shell atop the primary platform in order to create a receptacle for a plurality of chocolate layers;

molding the secondary platform by pouring a silicone material into the tubular shell;

actuating the tilt mechanism in order to rotate the primary platform in relation to a flat supporting surface;

sequentially pouring each of the plurality of chocolate layers into the tubular shell; and removing the layered chocolate body from the mold.

7. The method as claimed in claim 6 comprising the step of:

sealing the tubular shell by securing the clamping mechanism around the tubular shell.

8. The method as claimed in claim 6 comprising the steps of:

solidifying the silicone material by elapsing a period of time;

drilling the shaft into the secondary platform in order to create a threaded engagement between the shaft and the secondary platform; and adhering the shaft covering onto the shaft.

9. The method as claimed in claim 6 comprising the steps of:

pouring an arbitrary chocolate layer into the receptacle;

solidifying the arbitrary chocolate layer over a cooling period;

pouring a subsequent chocolate layer into the receptacle and onto the arbitrary chocolate layer; and solidifying the subsequent layer of chocolate over the cooling period.

10. The method as claimed in claim 9, wherein the arbitrary chocolate layer is a base layer within the plurality of chocolate layers and the subsequent layer is an intermediate layer within the plurality of chocolate layers.

11. The method as claimed in claim 10, wherein the arbitrary chocolate layer is a base layer within the plurality of chocolate layers and the subsequent layer is a top layer within the plurality of chocolate layers.

12. The method as claimed in claim 10, wherein the arbitrary chocolate layer is a first intermediate layer within the plurality of chocolate layers and the subsequent layer is a second intermediate layer within the plurality of chocolate layers.

13. The method as claimed in claim 10, wherein the arbitrary chocolate layer is an intermediate layer within the plurality of chocolate layers and the subsequent layer is a top layer within the plurality of chocolate layers.

14. The method as claimed in claim 6 comprising the steps of:

disengaging the mold from the layered chocolate body by releasing the clamping mechanism;

disengaging the mold from the layered chocolate body by releasing the lid;

disengaging the mold from the layered chocolate body by releasing the tubular shell along the elongated slit; and disengaging the mold from the layered chocolate body by releasing the shaft.

* * * * *